INVENTORS.
HOWARD SCHIMMEL
CLARENCE S. CLAY, JR.
BY Louis B. Applebaum
ATTORNEY

INVENTORS.
HOWARD SCHIMMEL
CLARENCE S. CLAY, JR.
BY
Louis B. Applebaum
ATTORNEY

Oct. 8, 1963

H. SCHIMMEL ETAL

VARIABLE-DELAY, ROTATING, SIGNAL-DELAY AND TIME COMPRESSION DEVICE 3,106,705

Filed Aug. 20, 1959

8 Sheets-Sheet 3

INVENTORS.
HOWARD SCHIMMEL
CLARENCE S. CLAY, JR.
BY

Louis B. Applebaum
ATTORNEY

INVENTORS.
HOWARD SCHIMMEL
CLARENCE S. CLAY, JR.
BY
Louis B. Applebaum
ATTORNEY

Oct. 8, 1963 H. SCHIMMEL ETAL 3,106,705

VARIABLE-DELAY, ROTATING, SIGNAL-DELAY AND TIME COMPRESSION DEVICE

Filed Aug. 20, 1959 8 Sheets-Sheet 5

INVENTORS.
HOWARD SCHIMMEL
CLARENCE S. CLAY, JR.
BY
Louis B. Applebaum
ATTORNEY

Oct. 8, 1963

H. SCHIMMEL ETAL

VARIABLE-DELAY, ROTATING, SIGNAL-DELAY AND TIME COMPRESSION DEVICE 3,106,705

Filed Aug. 20, 1959

8 Sheets-Sheet 6

INVENTORS.
HOWARD SCHIMMEL
CLARENCE S. CLAY, JR.
BY

ATTORNEY

INVENTORS.
HOWARD SCHIMMEL
CLARENCE S. CLAY, JR.
BY
Louis B. Applebaum
ATTORNEY

INVENTORS.
HOWARD SCHIMMEL
CLARENCE S. CLAY, JR.
BY
Louis B. Applebaum
ATTORNEY 3,106,705

VARIABLE-DELAY, ROTATING, SIGNAL-DELAY AND TIME COMPRESSION DEVICE

Howard Schimmel, Tuckahoe, and Clarence S. Clay, Jr., Hastings, N.Y., assignors to the United States of America as represented by the Secretary of the Navy Filed Aug. 20, 1959, Ser. No. 835,156
22 Claims. (Cl. 340—174.1)

This invention relates to recording devices and especially to a rotating signal-delay device which employs recording tape as its operational medium.

Present signal delay devices are generally incapable of providing delays greater than about one second in duration. The present invention is capable of providing delays in the order of seconds or even minutes. It further provides continuous scanning of a plurality of signals, time compression of the scanned signals, repetitive reading of recorded signals, fixed delays or continuously variable delays and variable rates of change of delay.

The invention is thus extremely useful for a great many applications such as wave analysis, display of transient phenomena, correlation function analyses, etc.

The objects and advantages of the present invention are accomplished by means of a device utilizing a recording medium, such as magnetic tape, in which playback of a plurality of recorded signals is accomplished by means of playback heads each mounted on the periphery of a different section of a split wheel. The split wheel rotates at a rapid rate under the relatively slowly moving recording medium so that many scans of the same area of the medium are accomplished before that area moves completely past the split wheel. In addition to the average rotational movement of the split wheel, helically splined sections of the shaft, which rotate the split wheel, advance and retard one or more sections of the split wheel with respect to a zero reference point. This advancement and retardation results in a delay of some signals with respect to others recorded on the medium, a delay which is continuously variable if the advancement and retardation of the wheel sections occurs continuously.

An object of this invention is to provide a long delay between a plurality of signals.

Another object is to provide a continuously variable delay between a plurality of signals.

A further object is to provide a device capable of determining the rates of change of delay among a plurality of signals.

Yet another object is to provide a device capable of compressing the time duration of a plurality of signals.

Other objects and many of the attendant advantages of this invention will be readily appreciated as the same becomes better understood by reference to the following detailed description when considered in connection with the accompanying drawings wherein.

Similar reference characters apply to similar elements in the different views.

Figure 1:
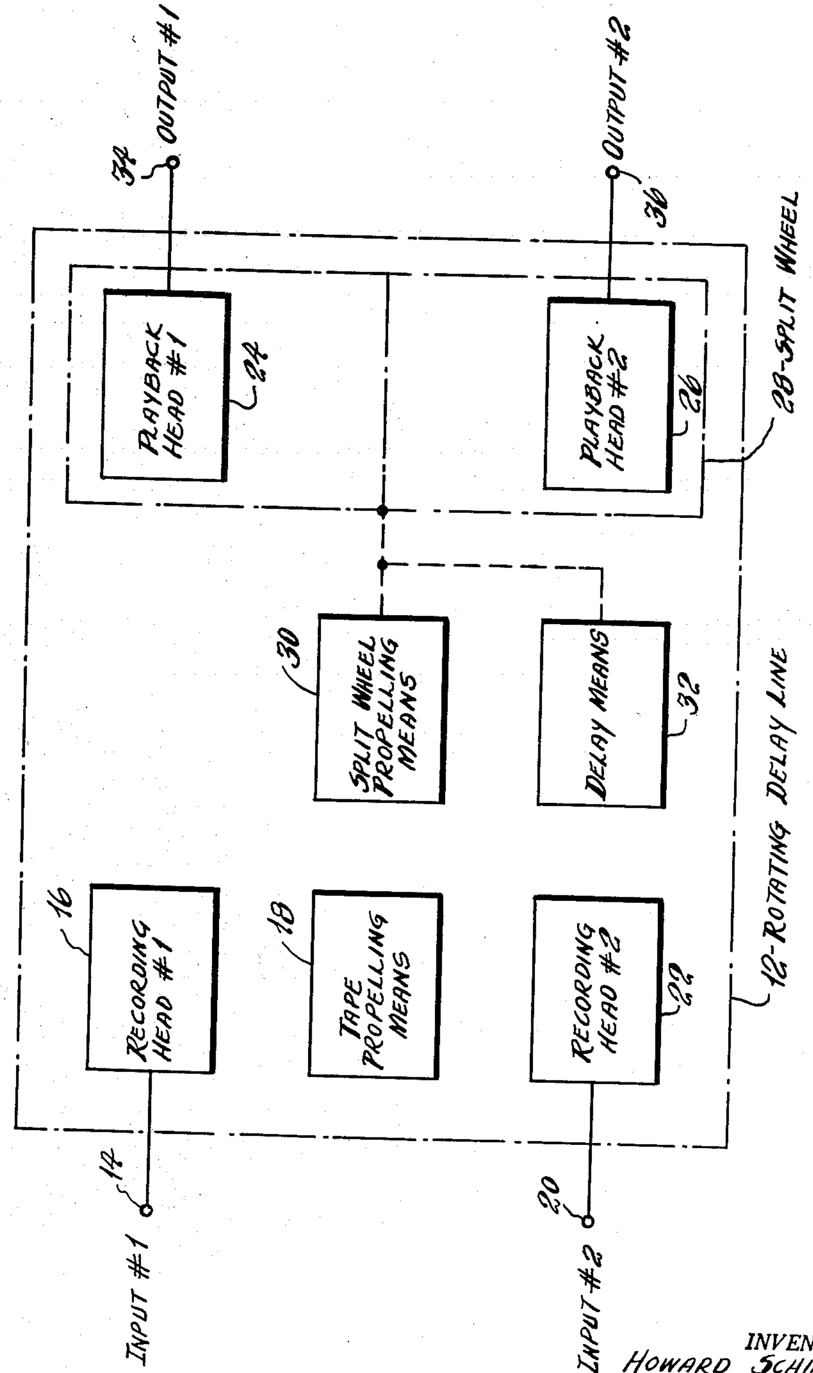
FIG. 1 is a block diagram of an embodiment of the invention.

FIG. 1 shows a rotating delay line 12 in block form. A first input (#1) is applied through an input terminal 14 to recording head #1 (16) which records it magnetically on half of the width of a magnetic recording tape (not shown). The tape is drawn past the recording head by a suitable tape propelling means 18 which can comprise a tape-drive system including a motor, pull and drag capstans, pressure wheels and supply and take-up reels.

A second input signal (#2) is applied through input terminal 20 to recording head #2 (22) which records the signal on the other half of the recording tape. (Although the present invention is described with respect to only two input signal channels, persons familiar with the recording art will understand that it can as readily be employed with additional signal channels.)

A pair of playback heads are used to pick up the recorded signals, playback head #1 (24) being used for input #1 and palyback head #2 (26) for input #2. Each playback head is mounted at the periphery of a separate wheel, the separate wheels constituting halves of a split wheel 28 (see FIGS. 2 and 3.)

Figure 5:
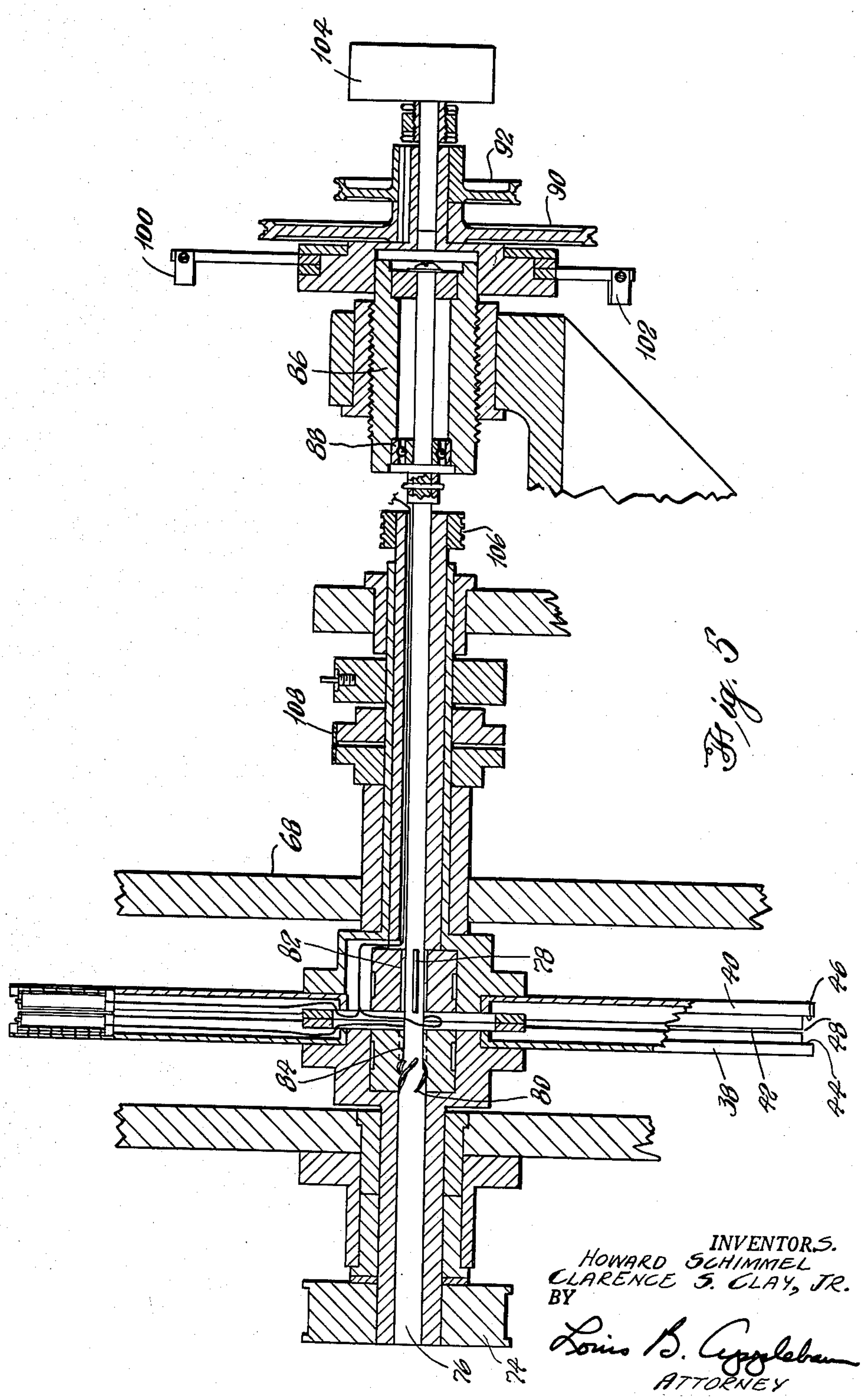
FIG. 5 is a cross-sectional view taken through the split-wheel shaft along the line 5—5 in FIG. 3.

The individual halves 38 and 40 of the split wheel 28 are separated from each other by a narrow air space 42 (see FIG. 5). The width of the split wheel 28 is sufficient ot accommodate the width of the recording tape and each half of the wheel has an outer flange 44 and 46 so that the tape fits into a groove 48. The surfaces of the wheel 28 which form the groove 48 are highly polished to a smooth finish.

The split wheel 28 is rotated by the split wheel propelling means 30 at a much higher rate of speed than the tape is propelled. Thus the average linear speed of a point on the circumference of the split wheel 28, such as the location of a playback head, is much greater than the average linear speed of the tape. Separate motor means can be used (as shown) or the wheel 28 may be suitably geared to the tape propelling means 18.

A feature of the invention is the cushioning effect of air which is drawn in through the space 42 between the wheel halves by the high speed of rotation of the split wheel 28. There appears to be a cushion of air between the polished surface of the split wheel 28 and the recording tape whereby the tape literally "rides on air" so that very little friction occurs between the tape and the wheel 28. Thus, the life of the tape is decreased to a negligible extent in spite of the great difference in speed between the tape and the split wheel 28.

A delay means 32 is employed to advance or retard one of the halves of the split wheel 28 which respect to the other half. This provides a delay in the signal coming through one channel with respect to the signal coming through the other channel.

Figure 2:
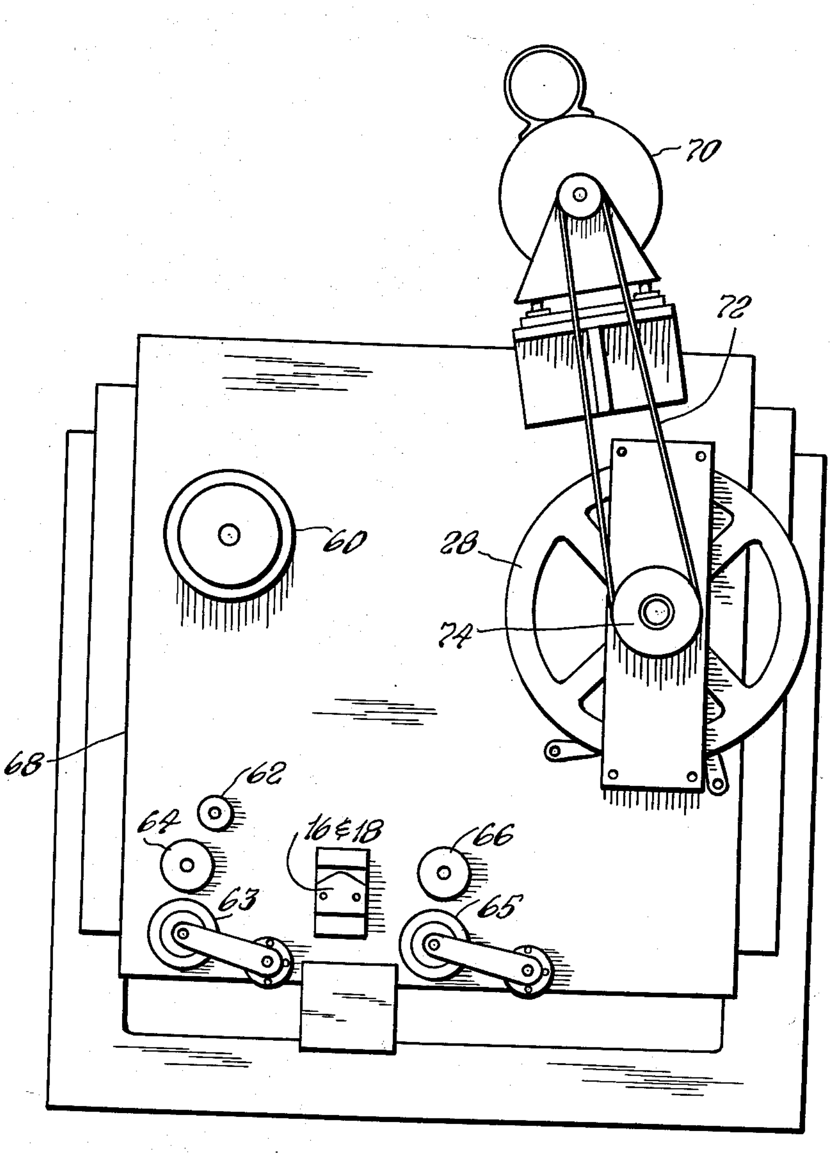
FIG. 2 is a plan view of the embodiment shown in block form in FIG. 1.

FIG. 2 shows a front view of one embodiment of the invention. The recording tape (not shown) is wound around a supply reel 60, a post 62 and a drag capstan 64, passes through the recording heads 16 and 18, and is wound around a pull capstan 66 and the split wheel 28. The capstans are driven by a tape-propelling motor 18 located on the rear of the panel 68 and the split-wheel shaft is driven by a motor 70, belt 72 and pulley 74. A pressure wheel (63 and 65) is provided for each capstan (64 and 66).

Figure 3:
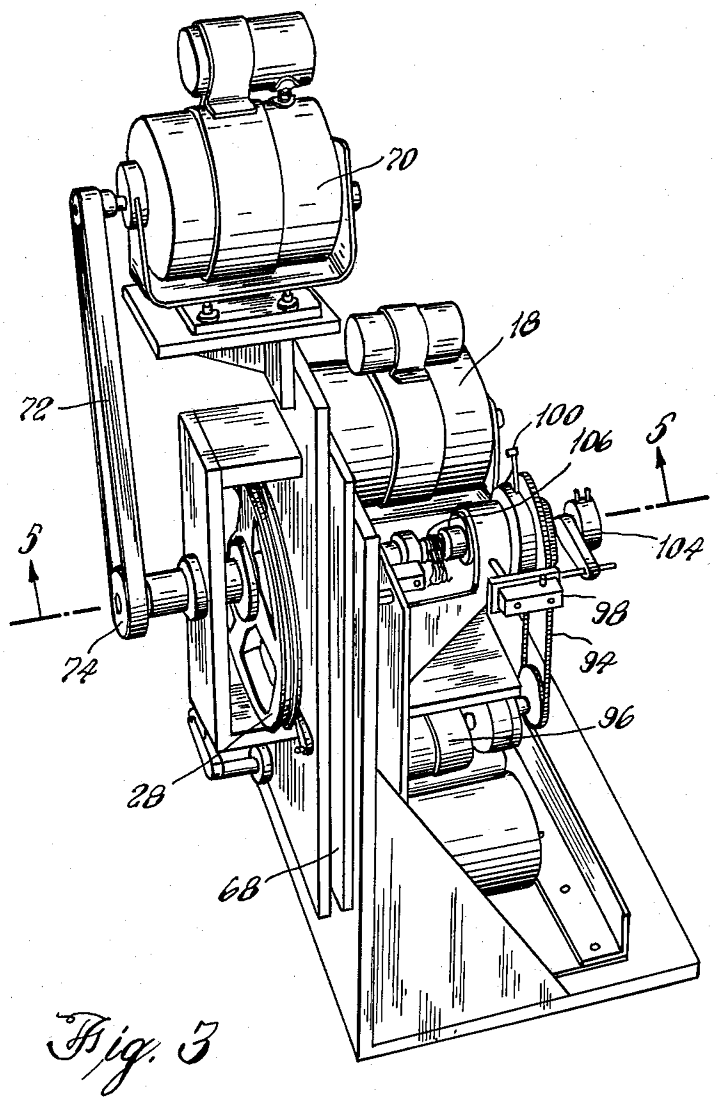
FIG. 3 is a side view of the embodiment shown in block form in FIG. 1.

A side perspective view of the same embodiment is shown in FIG. 3.

Figure 4:
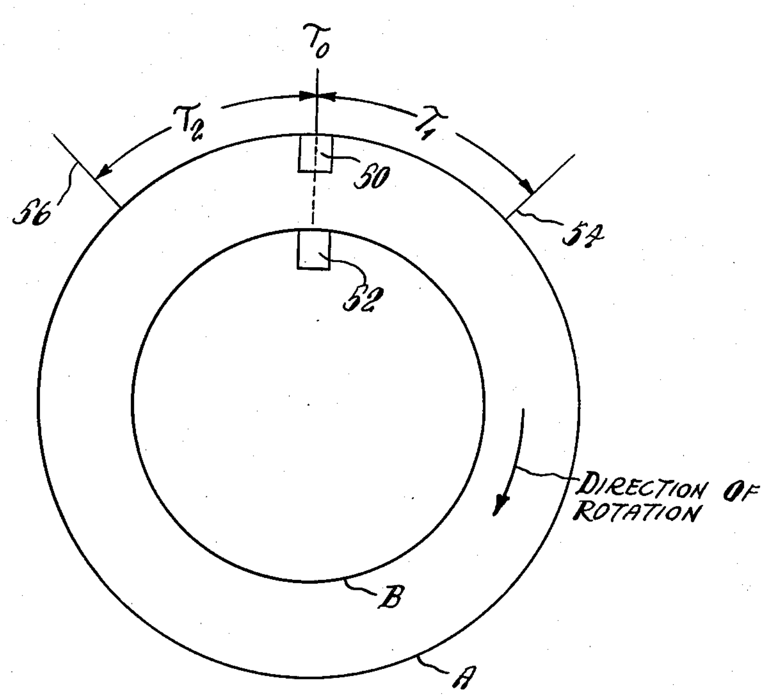
FIG. 4 is a diagrammatic representation of the delay relations between the sections of the split wheel.

FIG. 4 illustrates the manner in which the delay between the two signal channels is accomplished. (For purposes of clarity, the wheel halves A and B are shown as having different radii, although they have equal radii in actual practice.) The playback heads of wheel halves A and B are situated in areas 50 and 52, respectively. If the playback heads are alined, there is no delay (denoted by $\tau_0$) and signals simultaneously recorded on both halves, or channels, of the tape will be played back simultaneously. (The amount of time by which a signal is delayed is denoted by the symbol $\tau$.) If wheel half A is advanced so that its playback head is at position 54, the signal on the tape half which is read by its playback head (the channel A signal) will be ahead of the channel B signal by an amount $\tau_1$ (or the channel B signal will be delayed relative to the channel A signal by an amount $\tau_1$). If wheel half A is retarded so that its playback head is at position 56, the channel A signal will be delayed relative to the channel B signal by an amount $\tau_2$.

The rotating delay line can be made to provide three different types of delay between the input signals. The first type is a fixed amount of delay, which can be obtained by advancing or retarding one of the wheel halves a fixed distance relative to the other wheel half. The second type is a constantly varying amount of delay, which can be obtained by moving one wheel half backward and forward around a zero position at a constant rate; thus, referring to FIG. 4 again, relative to the $\tau_0$ position of wheel B, wheel A might be moved from position 56 to position 54 and back again during each cycle of rotation of the wheels A and B (note that the backward and forward movement is superimposed on the normal rotation of wheel A). The third type is a varying rate of change of delay, which can be obtained in different ways, one of them being to maintain a fixed rate of change of delay for each cycle of rotation but to alter the rate of change of delay for consecutive cycles of rotation. (Thus, during the first cycle, wheel A can be shifted from position 56 to position 54 at a certain constant angular speed relative to wheel B; during the second cycle, this angular speed will be increased a given percentage; during the third cycle, the angular speed will be increased by a further amount; and so on.)

The manner in which one wheel half is shifted in position relative to the other while both are rotating may be understood by reference to FIG. 5, which is a cross-sectional view of an embodiment of the invention taken along line 5—5 in FIG. 3.

The pulley 74 is affixed to a drive shaft 76 which bears a number of straight splines 78 and helical splines 80. The straight splines fit into straight keyways 82 in wheel half 40 (which corresponds to wheel B in FIG. 4) and thereby provide rotational thrust for this half of the split wheel 28. The helical splines 80 fit into helical keyways 84 in wheel half 38 (which corresponds to wheel A in FIG. 4) and thereby provide rotational thrust for this half of the split wheel 28. Since both sets of splines are attached to the same shaft 76, the wheel halves A and B have the same average rotational speed. However, the shaft 76 can move backward and forward along its axial direction to a limited extent. The longitudinal movement of the shaft 76 with respect to wheel A twists wheel A relative to wheel B since the helical keyways 84 must move rotationally in response to any longitudinal movement of the helical splines 80. Thus, forward and backward movement of the shaft 76 imparts an additional backward or forward movement to wheel A relative to wheel B over and above the average rotational movement imparted by the rotation of the shaft 76 by the motor 70. (The splines 80 are shown in FIG. 5 at one extreme of the movement of the shaft 76; the position of the playback head of wheel A corresponding to the spline position in FIG. 5 would be either position 56 or 54, if $\tau_1$ and $\tau_2$ in FIG. 4 are considered to be the greatest possible amounts of delay attainable with this particular embodiment of the invention.)

The shaft 76 is moved axially by means of the delay actuating assembly 86. This is an assembly supported by ball bearings 88 at the end of the shaft 76. Rotation of the assembly 86 imparts a longitudinal thrust to the shaft 76 through the ball bearings; reversing the direction of rotation of the assembly 86 reverses the direction of travel of the shaft 76. A ball chain drive belt 94 over pulleys 90 or 92 provides rotational motion to the delay actuating assembly 86. The belt 94 is actuated by a D.C. drive motor 96. A limit switch 98 is mechanically actuated by limit arms 100 and 102 at the desired extremes of rotation of the delay actuating assembly 86 to reverse the direction of rotation of the drive motor 96. (Such reversing mechanisms and circuits are well known and will not be further described herein.)

The speed of the D.C. drive motor 96 can be varied by varying the amplitude of its energizing voltage.

A further desirable feature is the potentiometer 104 shown mounted at the end of the shaft 76. The movable arm of the potentiometer 104 is rotated by the shaft 76 and the resistance of the potentiometer 104 is connected in circuit (not shown) with a source of D.C. voltage and a zero center galvanometer to form a sensing means which indicates the amount of delay to the operator (since the amount of delay is proportional to the angular position of the shaft 76).

The signal outputs from the playback heads are taken off by means of a slip ring assembly 106. A shorting wheel 108 is also provided for a purpose which will be explained hereinafter.

In operation, the invention may be employed as a fixed-delay delay line by energizing the D.C. drive motor 96 until the desired amount of delay (i.e., the desired amount of angular displacement of wheel A relative to wheel B) is obtained and then maintaining this amount of delay of de-energizing the drive motor 96.

Secondly, a continuously variable amount of delay within limits determined by the design of the device may be obtained by applying a constant D.C. energizing potential to the D.C. drive motor 96, allowing the motor rotation to be reversed by the action of the limit arms 100 and 102 on the limit switch 98. This mode of operation permits the scanning of two input signals which are delayed with respect to each other and a determination of the amount of the delay.

Thirdly, input signals may be scanned not only to determine their delays with respect to each other, but also to determine the rate at which the relative delay is changing $$\left(\frac{d\tau}{dt}\right)$$

This is useful, for example, in the analysis of signals received by two spaced stations from a moving target (signals affected by Doppler shift). The rate of change of the delay may be obtained by incrementally changing the speed of rotation of the drive motor 96 after each cycle of axial movement of the shaft 76. This might be used in computing the speed of the moving target.

Figure 6:
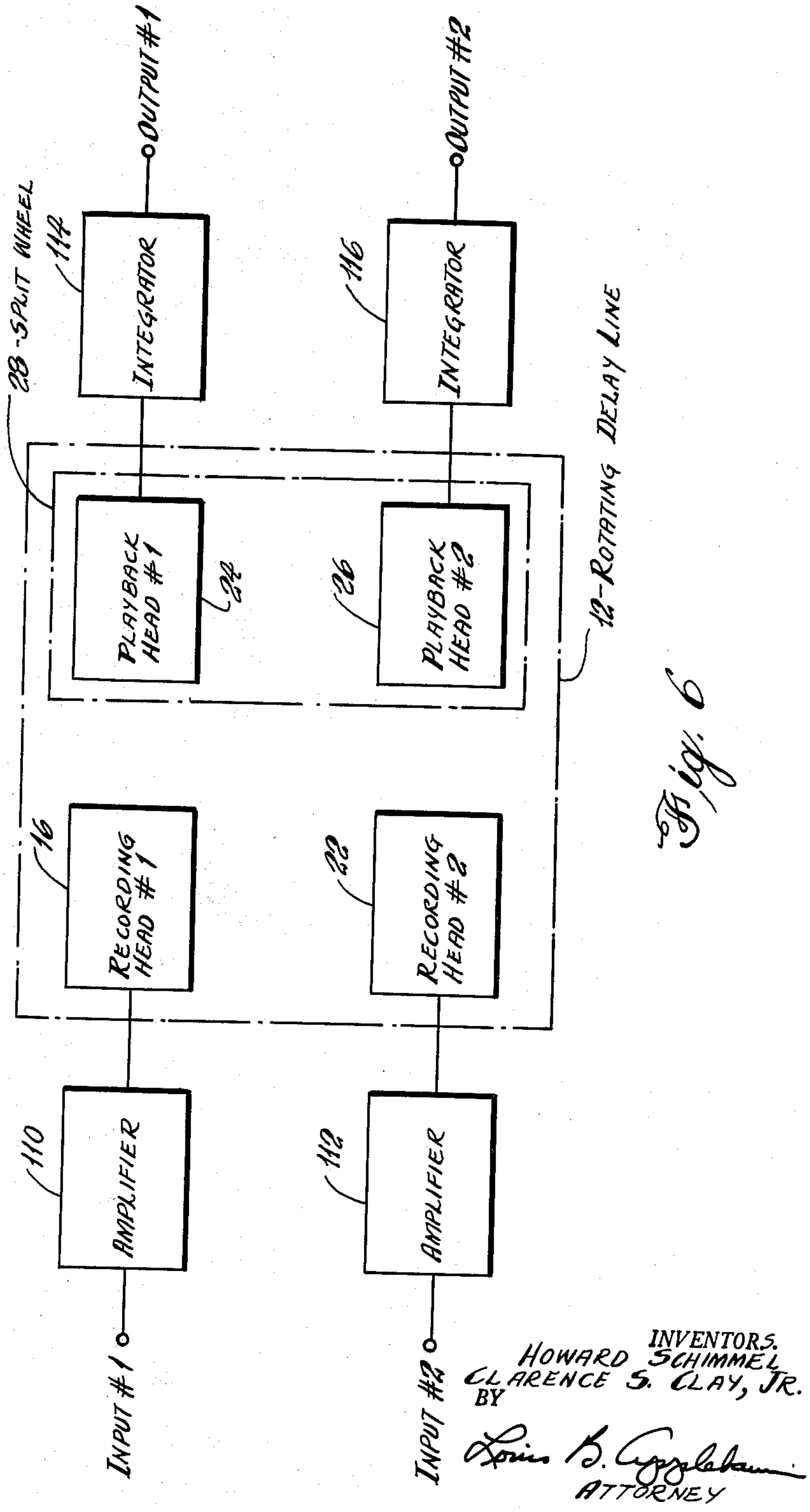
FIG. 6 is a block diagram of a fixed delay line which employs the invention.

The first mode of operation may be employed by the device shown in FIG. 6. Here the two input signals are applied to separate amplifiers 110 and 112, if desired, before being coupled to the recording heads. (The rotating delay line 12 is shown in abbreviated form in this figure; it should be noted that the complete line 12 is as shown in FIG. 1).

A fixed amount of delay is provided by the split wheel 28 and the signals are then passed through separate integrators 114 and 116, which can be simple resistance capacitor networks, to reconstitute them in their original waveforms (the output of a playback head is the differential of the signal on the tape).

Figure 7:
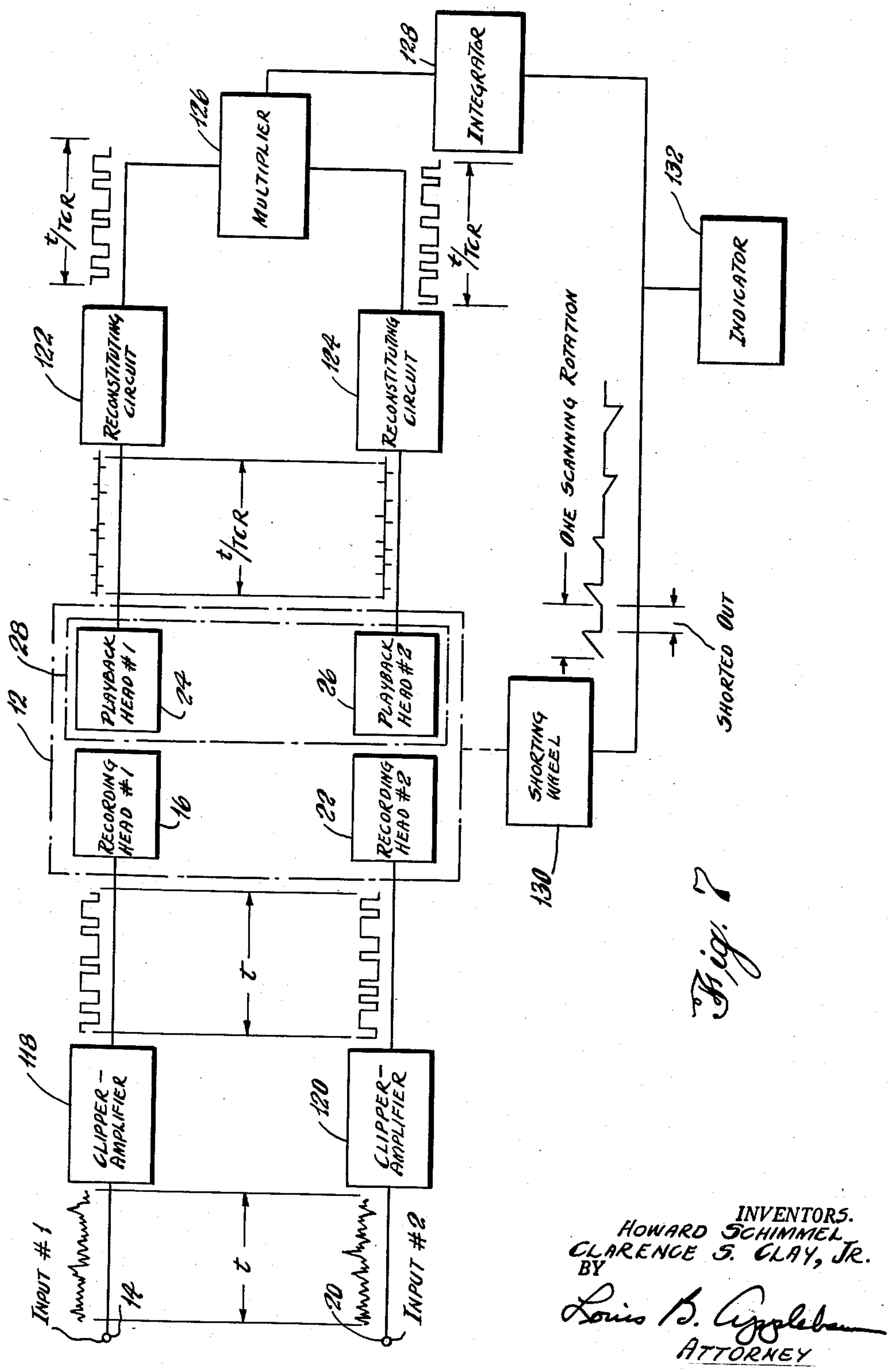
FIG. 7 is a block diagram of a correlation function computer which employs the invention.

The second mode of operation may be employed in a correlation function computer, one form of which is illustrated in the block diagram of FIG. 7. Here, each of a pair of input signals is fed in a separate channel through a clipper-amplifier stage which amplifies the signal and clips it; a recording head which records the signal on magnetic tape; a playback head which reads the signal off the tape; and a reconstituting circuit which reconstructs the wave shape of the signal as it was when it was recorded on the tape. The recording heads and playback heads are part of the rotating delay line 12 as shown in FIG. 1.

The outputs of the reconstituting circuits are now multiplied in a multiplier 126 and integrated in an integrater. The output signal can be fed to an indicator 132 such as a pen recorder.

The output signal is shorted out once during each rotation by means of a shorting wheel 130 which contains a metallic shorting segment that extends over approximately half the circumference of the wheel 130. The latter is mounted on and rotates with the shaft 76 of the rotating delay line 12.

In analyzing the pair of signals for correlation, or matching, the rotating delay line 12 operates in the continuously variable delay mode, i.e., wheel A continuously scans, or moves, backwards and forwards relative to a zero position of wheel B, as previously explained. If there is a correlation between the two input signals, the output of the integrator 128 will increase in magnitude in proportion to the closeness to which exact correlation is approached. Thus, let us suppose that signals of low magnitude are being received by two spaced stations so that a certain time delay exists between the received signals, and the received signals are masked by the noise level; continuously variable delay scanning of these input signals will provide an output signal which increases in magnitude as the delay between wheels A and B approaches equality with the delay between the input signals, the output signal magnitude being a maximum when the two delays are identical. This increase in magnitude of the output signal is evident on the record of the pen recorder (or other indicator 132) and shows the operator that some desired signal is present in the noise.

If the output signal were not shorted out, the signal would slowly build up and decrease on the capacitor which comprises a component of the integrator 128. This "averaging" effect makes it difficult to ascertain when the input signals are matched, or correlated, and so, in this type of application, the integrator output is shorted once during each shaft rotation. In other applications, an averaging effect may be desirable and the shorting wheel 130 may be disconnected.

FIG. 7 indicates waveforms of the input and output signals at each stage. The symbol ($t$) indicates a given signal duration in time units. The symbol (TCR) stands for "time compression ratio." The signals which are read out by the playback heads 24 and 26 are compressed in time by an amount which depends upon the speed of rotation of the split wheel 28 relative to the linear speed of the recording tape. A time compression of the order of 1000:1 is attainable without difficulty.

Figure 8:
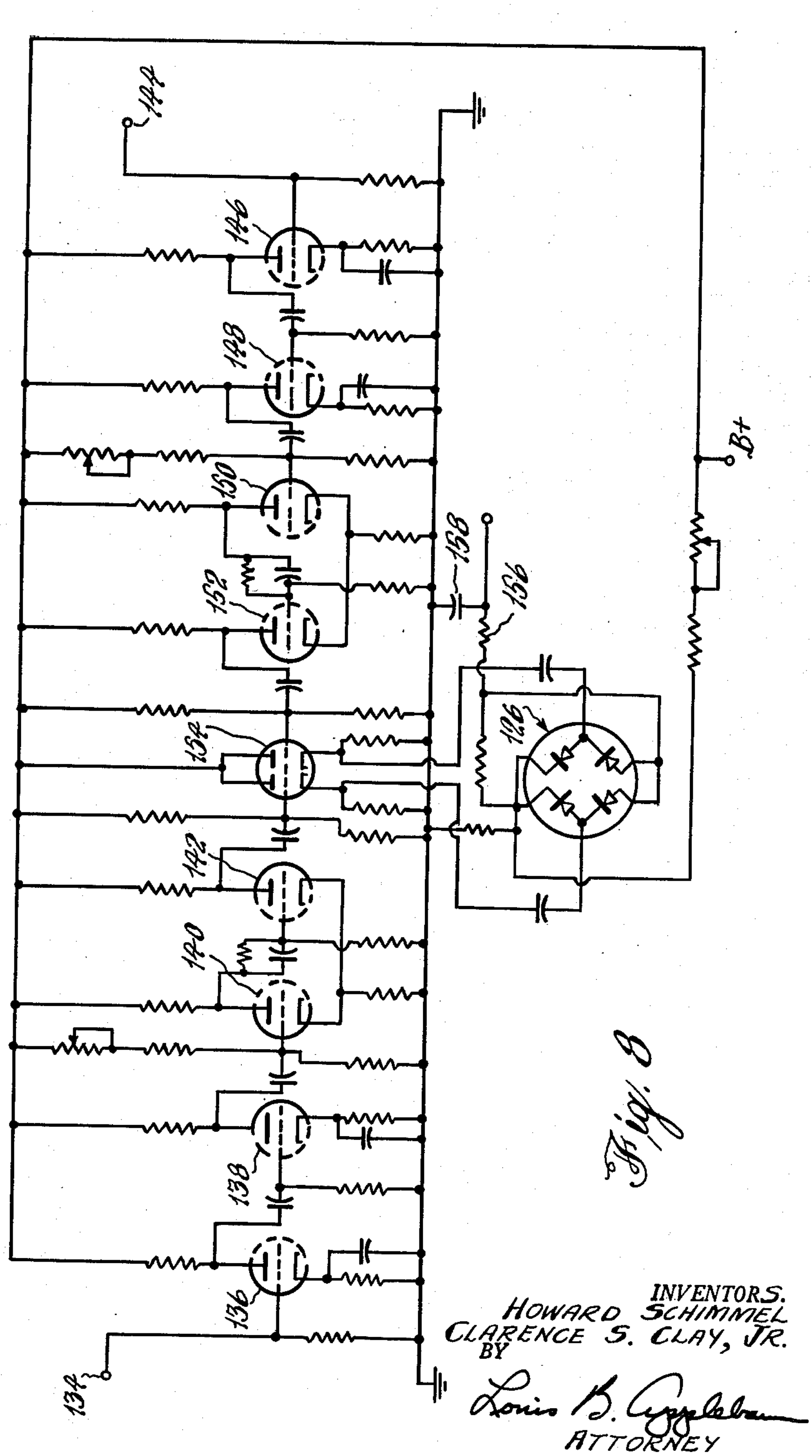
FIG. 8 is a schematic circuit diagram showing circuitry which can be used in the correlation function computer of FIG. 7.

FIG. 8 shows a circuit which can be employed for the correlation function computer of FIG. 7. The circuitry is conventional and therefore will not be described in great detail. The output from playback head #1 is fed through terminal 134 to an amplifier comprising tubes 136 and 138. The output of the amplifier is then applied to a reconstituting circuit 122 consisting of a Schmitt trigger circuit, tubes 140 and 142.

The output from playback head #2 is similarly fed through terminal 144 to an amplifier comprising tubes 146 and 148. The amplifier output is then applied to another reconstituting circuit 124 consisting of a Schmitt trigger circuit, tubes 150 and 152.

The reconstituting circuit outputs are fed through a cathode follower 154 to a multiplier 126 comprising a four-element bridge rectifier. The multiplied output is then integrated by an R–C integrator 128 consisting of a resistance 156 and a capacitance 158 and applied to output terminal 133. The connection to the shorting wheel 130 is not shown in this figure, nor is the indicator 132.

Obviously many modifications and variations of the present invention are possible in the light of the above teachings. It is therefore to be understood that within the scope of the appended claims the invention may be practiced otherwise than as specifically described.

We claim:

1. A signal-deriving device for deriving a plurality of signals separately recorder on a recording medium comprising, in combination: sectioned, rotary, signal-deriving means, each section deriving a different one of said recorded signals from said medium; means for propelling said medium past said signal-deriving means; means for rotating said signal-deriving means at a rate such that the average circumferential speed of said signal-deriving means is greater than the average linear speed of travel of said recording medium; and means for displacing at least one of said sections relative to the others whereby the signal derived by the displaced section is correspondingly displaced in time relative to the signals derived by said other sections.

2. A signal-deriving device for deriving a plurality of signals separately recorded on a recording medium comprising, in combination: sectioned, rotary, signal-deriving means, each section deriving a different one of said recorded signals from said medium; means for propelling said medium past said signal-deriving means; means for rotating said signal-deriving means at a rate such that the average circumferential speed of said signal-deriving means is greater than the average linear speed of travel of said recording medium; and helical means for displacing at least one of said sections relative to the others whereby the signal derived by the displaced section is correspondingly displaced in time relative to the signals derived by said other sections.

3. A signal-deriving device for deriving a plurality of signals separately recorded on a recording medium comprising, in combination: sectioned, rotary, signal-deriving means, each section deriving a different one of said recorded signals from said medium; means for propelling said medium past said signal-deriving means; means for rotating said signal-deriving means at a rate such that the average circumferential speed of said signal-deriving means is greater than the average linear speed of travel of said recording medium; and means for continuously displacing the angular position of at least one of said sections backwards and forwards from a zero reference position relative to the other sections, whereby the signal derived by the displaced section is correspondingly continuously varying in time displacement relative to the signals derived by said other sections.

4. A signal-deriving device for deriving a plurality of signals separately recorded on a recording medium comprising, in combination: sectioned, rotary signal-deriving means, each section deriving a different one of said recorded signals from said medium; means for propelling said medium past said signal-deriving means; means for rotating said signal-deriving means at a rate such that the average circumferential speed of said signal-deriving means is greater than the average linear speed of travel of said recording medium; and helical means for continuously displacing the angular position of at least one of said sections backwards and forwards from a zero reference position relative to the other sections, whereby the signal derived by the displaced section is correspondingly continuously varying in time displacement relative to the signals derived by said other sections.

5. A signal-deriving device for deriving a plurality of signals separately recorded on a recording medium comprising, in combination: signal-deriving means comprising a shaft, a wheel mounted on and rotatable by said shaft, said wheel being split transversely to said shaft into a plurality of sections, and a plurality of signal-deriving members, each mounted on a different one of said wheel sections for deriving a different one of said recorded signals; means for propelling said recording medium past said wheel sections, said wheel sections effectively providin support for said recording medium; means for rotating said shaft at a rate such that the average linear speed of said signal-deriving members is greater than the average linear speed of travel of said recording medium; and means for angularly displacing at least one of said wheel sections relative to the others comprising at least one helical spline mounted on said shaft, a complementary keyway excised from said displaceable wheel section, and means for moving said shaft along its axial direction.

6. A signal-deriving device for deriving a plurality of signals separately recorded on a recording medium comprising, in combination: signal-deriving means comprising a shaft, a wheel mounted on and rotatable by said shaft, said wheel being split transversely to said shaft into a plurality of sections, and a plurality of signal-deriving members, each mounted on a different one of said wheel sections for deriving a different one of said recorded signals; means for propelling said recording medium past said wheel sections, said wheel sections effectively providing support for said recording medium; means for rotating said shaft at a rate such that the average linear speed of said signal-deriving members is greater than the average linear speed of travel of said recording medium; and means for angularly displacing at least one of said wheel sections backwards and forwards from a zero reference position relative to the others comprising at least one helical spline mounted on said shaft, a complementary keyway excised from said displaceable wheel section, and means for moving said shaft backwards and forwards along its axial direction.

7. A signal-deriving device for deriving a plurality of signals separately recorded on a recording medium comprising, in combination: signal-deriving means comprising a shaft, a wheel mounted on and rotatable by said shaft, said wheel being split transversely to said shaft into a plurality of sections, and a plurality of signal-deriving members, each mounted on a different one of said wheel sections for deriving a different one of said recorded signals; means for propelling said recording medium past said wheel sections, said wheel sections effectively providing support for said recording medium; means for rotating said shaft at a rate such that the average linear speed of said signal-deriving members is greater than the average linear speed of travel of said recording medium; and means for continuously displacing the angular position of at least one of said wheel sections backwards and forwards from a zero reference position relative to the others comprising at least one helical spline mounted on said shaft, a complementary keyway excised from said displaceable wheel section, and means for continuously moving said shaft backwards and forwards from a zero reference position along its axial direction.

8. A signal-deriving device for deriving a plurality of signals separately recorded on a magnetic tape comprising, in combination: signal-deriving means comprising a shaft, a wheel mounted on and rotatable by said shaft, said wheel being split transversely to said shaft into a plurality of sections, and a plurality of magnetic playback heads, each mounted peripherally on a different one of said wheel sections for deriving a different one of said recorded signals; means for propelling said tape past the periphery of said wheel sections, said tape following the periphreal contour of said wheel for some distance, and said wheel effectively providing support for said magnetic tape; means for rotating said shaft at a rate such that the average linear speed of said playback heads is greater than the average linear speed of travel of said recording medium; and means for angularly displacing at least one of said wheel sections from a zero reference position relative to the others comprising at least one helical spline mounted on said shaft, a complementary keyway excised from said displaceable wheel section, and means for displacing said shaft from a zero reference position along its axial direction.

9. A signal-deriving device for deriving a plurality of signals separately recorded on a magnetic tape comprising, in combination: signal-deriving means comprising a shaft, a wheel mounted on and rotatable by said shaft, said wheel being split transversely to said shaft into a plurality of sections, and a plurality of magnetic playback heads, each mounted peripherally on a different one of said wheel sections for deriving a different one of said recorded signals; means for propelling said tape past the periphery of said wheel sections, said tape following the peripheral contour of said wheel for some distance, and said wheel effectively providing support for said magnetic tape; means for rotating said shaft at a rate such that the average linear speed of said playback heads is greater than the average linear speed of travel of said magnetic tape; and means for continuously displacing the angular position of at least one of said wheel sections backwards and forwards from a zero reference position relative to the others comprising at least one helical spline mounted on said shaft, a complementary keyway excised from said displaceable wheel section, and means for continuously displacing said shaft backwards and forwards from a zero reference position along its axial direction.

10. A signal recording-and-deriving device comprising, in combination: a recording medium; recording means for separately recording a plurality of individual signals on said recording medium; playback means for deriving the signals recorded on said recording medium, said playback means comprising rotatable wheel means divided transversely to its axis into a plurality of sections and a plurality of signal-deriving members, each mounted on a different one of said sections for deriving a different one of said individual signals recorded on said medium; means for propelling said recording medium past said recording means and said signal-deriving members, said recording medium travelling past a peripheral section of said wheel means and effectively being supported thereby; means for rotating said rotatable wheel means at a rate such that the average linear speed of said signal-deriving members is greater than the average linear speed of travel of said recording medium; and means for angularly displacing at least one of said wheel sections relative to the others whereby the signal derived by the signal-deriving member mounted on the displaced wheel section is correspondingly displaced in time relative to the signals derived by said other signal-deriving members.

11. A signal recording-and-deriving device comprising, in combination: a recording medium; recording means for separately recording a plurality of individual signals on said recording medium; playback means for deriving the signals recorded on said recording medium, said playback means comprising rotatable wheel means divided transversely to its axis into a plurality of sections and a plurality of signal-deriving members, each mounted on a different one of said sections for deriving the signal recorded in a different one of said channels on said medium; means for propelling said recording medium past said recording means and said signal-deriving members, said recording medium travelling past a peripheral section of said wheel means and effectively being supported thereby; means for rotating said rotatable wheel means at a rate such that the average linear speed of said signal-deriving members is greater than the average linear speed of travel of said recording medium; and means for continuously displacing the angular position of at least one of said wheel sections backwards and forwards from a zero reference position relative to the other sections, whereby the signal derived by the signal-deriving member mounted on the displaced wheel section is correspondingly continuously varying in time displacement relative to the signals derived by said other signal-deriving members.

12. A signal recording-and-deriving device comprising, in combination: a recording medium; recording means for separately recording a plurality of individual signals on said recording medium; playback means for deriving the signals recorded on said recording medium, said playback means comprising rotatable wheel means divided transversely to its axis into a plurality of sections and a plurality of signal-deriving members, each mounted on a different one of said sections for deriving a different one of said individual signals recorded on said medium; means for propelling said recording medium past said recording means and said signal-deriving members, said recording medium travelling past a peripheral section of said wheel means and effectively being supported thereby; means for rotating said rotatable wheel means at a rate such that the average linear speed of said signal-deriving members is greater than the average linear speed of travel of said recording medium; and helical means for angularly displacing at least one of said wheel sections relative to the others whereby the signal derived by the signal-deriving member mounted on the displaced wheel section is correspondingly displaced in time relative to the signals derived by said other signal-deriving members.

13. A signal recording-and-deriving device comprising, in combination: a recording medium; recording means for separately recording a plurality of individual signals on said recording medium; playback means for deriving the signals recorded on said recording medium, said playback means comprising rotatable wheel means divided transversely to its axis into a plurality of sections and a plurality of signal-deriving members, each mounted on a different one of said sections for deriving a different one of said individual signals recorded on said medium; means for propelling said recording medium past said recording means and said signal-deriving members, said recording medium traveling past a peripheral section of said wheel means and effectively being supported thereby; means for rotating said rotatable wheel means at a rate such that the average linear speed of said signal-deriving members is greater than the average linear speed of travel of said recording medium; and helical means for angularly displacing at least one of said wheel sections relative to the others whereby the signal derived by the signal-deriving member mounted on the displaced wheel section is correspondingly displaced in time relative to the signals derived by said other signal-deriving members.

14. A correlation function computer comprising, in combination: input terminals for a plurality of input signals; a plurality of amplifier-clipper circuits, each connected to a different one of said input terminals for amplifying and clipping said input signals; signal recording-and-deriving means connected to said amplifier-clipper circuits comprising a recording medium, recording means for separately recording the output signals of each said amplifier-clipper circuit on said recording medium, playback means for deriving the recorded signals, said playback means comprising rotatable wheel means divided transversely to its axis into a plurality of sections and a plurality of signal-deriving members, each mounted on a different one of said sections for deriving a different one of said separately recorded signals, means for propelling said recording medium past said recording means and said signal-deriving members, means for rotating said rotatable wheel means at a rate such that the average linear speed of said signal-deriving members is greater than the average linear speed of travel of said recording medium, and means for angularly displacing at least one of said wheel sections relative to the others whereby the signal derived by the signal-deriving member mounted on the displaced wheel section is correspondingly displaced in time relative to the signals derived by said other signal-deriving members; a plurality of reconstituting circuits, each connected to a different one of said signal-deriving members for reshaping the output signals of said signal-deriving members so that each signal is substantially identical to its progenitor as the latter appeared when fed to said recording means; multiplying means connected to said reconstituting circuits for multiplying the output signals of said reconstituting circuits; integrating means connected to said multiplying means for integrating the output signal of said multiplying means; indicating means connected to said integrating means for indicating the output signal of said integrating means; and shorting means connected to said integrating means and coupled to said rotatable wheel means for shorting out the output of said integrating means during part of the period of each rotation of said rotatable wheel means.

15. A correlation function computer comprising, in combination: input terminals for a plurality of input signals; a plurality of amplifier-clipper circuits, each connected to a different one of said input terminals for amplifying and clipping said input signals; signal recording-and-deriving means connected to said amplifier-clipper circuits comprising a recording medium, recording means for separately recording the output signals of each said amplifier-clipper circuit on said recording medium, playback means for deriving the recorded signals, said playback means comprising rotatable wheel means divided transversely to its axis into a plurality of sections and a plurality of signal-deriving members, each mounted on a different one of said sections for deriving a different one of said separately recorded signals, means for propelling said recording medium past said recording means and said signal-deriving members, means for rotating said rotatable wheel means at a rate such that the average linear speed of said signal-deriving members is greater than the average linear speed of travel of said recording medium, and means for continuously displacing the angular position of at least one of said wheel sections from a zero reference position relative to the other sections, whereby the signal derived by the signal-deriving member mounted on the displaced wheel section is correspondingly continuously varying in time displacement relative to the signals derived by said other signal-deriving members; a plurality of reconstituting circuits, each connected to a different one of said signal-deriving members for reshaping the output signals of said signal-deriving members so that each signal is substantially identical to its progenitor as the latter appeared when fed to said recording means; multiplying means connected to said reconstituting circuits for multiplying the output signals of said reconstituting circuits; integrating means connected to said multiplying means for integrating the output signal of said multiplying means; indicating means connected to said integrating means for indicating the output signal of said integrating means; and shorting means connected to said integrating means and coupled to said rotatable wheel means for shorting out the output of said integrating means during part of the period of each rotation of said rotatable wheel means.

16. A signal-deriving device for deriving a plurality of signals separately recorded on a recording medium comprising, in combination: signal-deriving means comprising a shaft, a wheel mounted on and rotatable by said shaft, said wheel being split transversely to said shaft into a plurality of sections, and a plurality of signal-deriving members, each mounted on a different one of said wheel sections for deriving a different one of said recorded signals; means for propelling said recording medium past the periphery of said wheel sections, said periphery effectively providing support for said recording medium; means for rotating said shaft at a rate such that the average linear speed of said signal-deriving means is greater than the average linear speed of travel of said recording medium; and means for angularly displacing at least one of said wheel sections relative to the others.

17. A signal-deriving device for deriving a plurality of signals separately recorded on a recording medium comprising, in combination: signal-deriving means comprising a shaft, a wheel mounted on and rotatable by said shaft, said wheel being split transversely to said shaft into a plurality of sections, and a plurality of signal-deriving members, each mounted on a different one of said wheel sections for deriving a different one of said recorded signals; means for propelling said recording medium past the periphery of said wheel sections, said periphery effectively providing support for said recording medium; means for rotating said shaft at a rate such that the average linear speed of said signal-deriving means is greater than the average linear speed of travel of said recording medium; and means for angularly displacing at least one of said wheel sections backwards and forwards from a zero reference position relative to the others.

18. A signal-deriving device for deriving a plurality of signals separately recorded on a magnetic tape comprising a shaft, a wheel mounted on and rotatable by said shaft, said wheel being split transversely to said shaft into a plurality of sections, and a plurality of magnetic playback heads, each mounted peripherally on a different one of said wheel sections for deriving a different one of said recorded signals, the periphery of said wheel sections effectively providing support for said magnetic tape; means for rotating said shaft at a rate such that the average speed of said signal-deriving means is greater than the average linear speed of travel of said magnetic tape; and means for angularly displacing at least one of said wheel sections from a zero reference position relative to the others.

19. A signal-deriving device for deriving a plurality of signals separately recorded on a recording medium comprising, in combination: sectioned, rotary, signal-deriving means, each section deriving a different one of said recorded signals from said medium; means for propelling said medium past said signal-deriving means; means for rotating said signal-deriving means at a rate such that the average linear speed of said signal-deriving means is greater than the average linear speed of travel of said recording medium; and means for displacing at least one of said sections relative to the others whereby a signal derived by the displaced section is correspondingly displaced in time relative to the signals derived by said other sections, the rate of change of said displacement of said one section being continuously variable through some predetermined range.

20. A signal-deriving device for deriving a plurality of signals separately recorded on a recording medium comprising, in combination: sectioned, rotary, signal-deriving means, each section deriving a different one of said recorded signals from said medium; means for propelling said medium past said signal-deriving means; means for rotating said signal-deriving means at rate such that the average linear speed of said signal-deriving means is greater than the average linear speed of travel of said recording medium; and means for displacing the angular position of at least one of said sections backwards and forwards from a zero reference postion relative to the other sections, the rate of change of said angular displacement being continuously variable through some predetermined range, whereby the rate of change of time displacement of the signal derived by the displaced section relative to the signals derived by the other sections is continuously variable.

21. A signal-deriving device for deriving a plurality of signals separately recorded on a recording medium comprising, in combination: signal-deriving means comprising a shaft, a wheel mounted on and rotatable by said shaft, said wheel being split transversely to said shaft into a plurality of sections, and a plurality of signal-deriving members, each mounted on a different one of said wheel sections for deriving a different one of said recorded signals; means for propelling said recording medium past said wheel sections, said wheel sections effectively providing support for said recording medium; means for rotating said shaft at a rate such that the average linear speed of said signal-deriving means is greater than the average linear speed of travel of said recording medium; and means for displacing the angular position of at least one of said wheel sections backwards and forwards from a zero reference position relative to the others, the rate of change of said angular displacement being continuously variable through some predetermined range, said displacement means comprising at least one helical spline mounted on said shaft, a complementary keyway excised from said displaceable wheel section, means for continuously moving said shaft backwards and forwards from a zero reference position along its axial direction, and means for continuously varying the rate at which said shaft moves backwards and forwards.

22. A signal-deriving device for deriving a plurality of signals separately recorded on a magnetic tape comprising, in combination: signal-deriving means comprising a shaft, a wheel mounted on and rotatable by said shaft, said wheel being split transversely to said shaft into a plurality of sections, and a plurality of magnetic playback heads, each mounted peripherally on a different one of said wheel sections for deriving a different one of said recorded signals; means for propelling said tape past the periphery of said wheel sections, said tape following the peripheral contour of said wheel for some distance, and said wheel effectively providing support for said tape; means for rotating said shaft at a rate such that the average linear speed of said signal-deriving means is greater than the average linear speed of travel of said tape; and means for displacing the angular position of at least one of said wheel sections backwards and forwards from a zero reference position relative to the others, the rate of change of said angular displacement being continuously variable through some predetermined range, said displacement means comprising at least one helical spline mounted on said shaft, a complementary keyway excised from said displaceable wheel section, means for continuously moving said shaft backwards and forwards from a zero reference position along its axial direction, and means for continuously varying the rate at which said shaft moves backwards and forwards.

References Cited in the file of this patent

UNITED STATES PATENTS

| | | |
|---|---|---|
| 2,755,422 | Livingston | July 17, 1956 |
| 2,831,069 | Snow | Apr. 15, 1958 |
| 2,968,798 | Drukey | Jan. 17, 1961 |